US012200292B2

(12) United States Patent
Yang et al.

(10) Patent No.: US 12,200,292 B2
(45) Date of Patent: Jan. 14, 2025

(54) USING PICTURE-IN-PICTURE WINDOW TO PLAY CONTENT WHEN NEEDED

(71) Applicant: DISH Network L.L.C., Englewood, CO (US)

(72) Inventors: Yunfeng Yang, Aurora, CO (US); John D Barbieri, Littleton, CO (US)

(73) Assignee: DISH NETWORK L.L.C., Englewood, CO (US)

(*) Notice: Subject to any disclaimer, the term of this patent is extended or adjusted under 35 U.S.C. 154(b) by 5 days.

(21) Appl. No.: 18/091,190

(22) Filed: Dec. 29, 2022

(65) Prior Publication Data

US 2024/0223843 A1 Jul. 4, 2024

(51) Int. Cl.
*H04N 21/431* (2011.01)
*H04N 5/45* (2011.01)

(52) U.S. Cl.
CPC ........... *H04N 21/4316* (2013.01); *H04N 5/45* (2013.01)

(58) Field of Classification Search
None
See application file for complete search history.

(56) References Cited

U.S. PATENT DOCUMENTS

| | | | | |
|---|---|---|---|---|
| 5,966,120 A * | 10/1999 | Arazi | ................ | H04N 21/4508 375/E7.269 |
| 6,177,931 B1 * | 1/2001 | Alexander | ....... | H04N 21/42204 348/E7.071 |
| 6,268,856 B1 * | 7/2001 | Bruck | .................... | G06Q 30/02 709/219 |
| 6,317,780 B1 * | 11/2001 | Cohn | ..................... | G06Q 30/02 709/217 |
| 6,756,997 B1 * | 6/2004 | Ward, III | ........... | H04N 21/4345 348/E7.071 |
| 8,151,295 B1 * | 4/2012 | Eldering | .......... | H04N 21/44016 725/35 |
| 11,533,533 B2 * | 12/2022 | Cormie | ............ | H04N 21/44204 |
| 12,063,423 B1 * | 8/2024 | Neuweg | ............. | H04N 21/8541 |

(Continued)

FOREIGN PATENT DOCUMENTS

GB 2425909 A * 11/2006 ......... H04N 21/2335

OTHER PUBLICATIONS

Moulding, "Innovative 'Picture in Picture' addressable ad format designed to boost inventory in live sport," Videonet, Sep. 6, 2021, 2 pages.

(Continued)

*Primary Examiner* — An Son P Huynh
(74) *Attorney, Agent, or Firm* — Seed IP Law Group LLP (57) ABSTRACT

According to principles of the disclosure, audio/video programs are dynamically and concurrently displayed to a user in a first window and a second window ("picture-in-picture display") based on the user's identified demographic characteristics. At least one of the audio/video programs is previously transmitted and saved to a memory of a set-top box and is loaded for display on demand. By storing a plurality of content with relevance to the user locally, the system may rapidly respond to breaks in an audio/video program the user is watching by initiating picture-in-picture display. The audio/video programs displayed in the first window and second window may be advertisements or any other audio/video program suitable for display.

20 Claims, 9 Drawing Sheets

(56) References Cited

U.S. PATENT DOCUMENTS

| | | | | |
|---|---|---|---|---|
| 2002/0083439 | A1* | 6/2002 | Eldering | H04N 7/165 348/E7.063 |
| 2002/0083441 | A1* | 6/2002 | Flickinger | H04H 60/27 725/35 |
| 2002/0083442 | A1* | 6/2002 | Eldering | H04N 21/4532 348/E7.063 |
| 2002/0123928 | A1* | 9/2002 | Eldering | G06Q 30/0254 348/E7.071 |
| 2002/0129368 | A1* | 9/2002 | Schlack | H04N 21/44016 348/E7.071 |
| 2002/0144262 | A1* | 10/2002 | Plotnick | H04N 21/458 348/E7.071 |
| 2004/0015999 | A1* | 1/2004 | Carlucci | H04N 21/454 348/E7.071 |
| 2007/0088805 | A1* | 4/2007 | Cyster | G06F 16/957 707/E17.119 |
| 2009/0276805 | A1* | 11/2009 | Andrews, II | H04N 21/435 725/38 |
| 2010/0153885 | A1* | 6/2010 | Yates | G06F 16/7867 707/723 |
| 2011/0069940 | A1* | 3/2011 | Shimy | H04N 21/4532 386/296 |
| 2011/0078023 | A1* | 3/2011 | Aldrey | G06Q 30/02 705/14.55 |
| 2011/0145856 | A1* | 6/2011 | Agarwal | H04N 21/25435 725/32 |
| 2012/0099022 | A1* | 4/2012 | Sundy | H04N 21/812 348/E5.057 |
| 2013/0031582 | A1* | 1/2013 | Tinsman | H04N 21/4316 725/36 |
| 2013/0036442 | A1* | 2/2013 | Wingert | H04N 21/42209 725/60 |
| 2013/0173765 | A1* | 7/2013 | Korbecki | H04N 21/42209 709/221 |
| 2014/0068692 | A1* | 3/2014 | Archibong | H04N 21/6334 725/116 |
| 2014/0250447 | A1* | 9/2014 | Schink | H04N 21/478 725/10 |
| 2014/0282677 | A1* | 9/2014 | Mantell | H04N 21/435 725/23 |
| 2015/0326814 | A1* | 11/2015 | Stephens | H04N 21/4316 725/32 |
| 2015/0332352 | A1* | 11/2015 | Kim | H04L 9/40 705/14.73 |
| 2016/0094875 | A1* | 3/2016 | Peterson | H04N 21/4312 725/41 |
| 2016/0227297 | A1* | 8/2016 | Bennett | H04N 21/25833 |
| 2017/0094370 | A1* | 3/2017 | Jankowski | H04N 21/2668 |
| 2017/0180795 | A1* | 6/2017 | Cremer | H04N 21/4383 |
| 2017/0195746 | A1* | 7/2017 | Gupta | H04N 21/812 |
| 2019/0191203 | A1* | 6/2019 | Asbun | H04N 21/4316 |
| 2019/0208277 | A1* | 7/2019 | Lewis | H04N 21/4333 |
| 2019/0373330 | A1* | 12/2019 | Bloch | H04N 21/4532 |
| 2020/0389684 | A1* | 12/2020 | Grover | H04N 21/812 |
| 2022/0368964 | A1* | 11/2022 | Uzaki | H04N 21/812 |
| 2023/0300396 | A1* | 9/2023 | Panchaksharaiah | H04N 21/4312 725/14 |

OTHER PUBLICATIONS

Patel, "Startup Pushes Picture-in-Picture Ads for Streaming TV," Wall Street Journal, Jan. 15, 2021, 4 pages.

Picture-by-Picture Experience, https://help.twitch.tv/s/article/picture-by-picture-ads?language=en_US, accessed Nov. 2, 2023, 4 pages.

"Startup Pushes Picture-in-Picture Ads for Streaming TV," UM US (Global Headquarters), Jan. 15, 2021, 2 pages.

* cited by examiner

USING PICTURE-IN-PICTURE WINDOW TO PLAY CONTENT WHEN NEEDED

BACKGROUND

This disclosure is in the general field of displaying picture-in-picture display, specifically displaying content loaded from a set-top box and displayed concurrently with an audio/video program based on a user's demographics.

While an audio/video program is being displayed, a television provider may periodically pause the audio/video program and display a picture-in-picture advertisement. These advertising breaks may be scheduled in advance, allowing the television provider to interleave the advertisements into the audio/video program before it is broadcasted to the viewer's device. In other cases, the television provider may utilize programmatic advertising services to provide advertisements in near-real-time, which is then spliced into the audio/video program in near-real-time at the television provider server before being broadcasted to the viewer's device.

BRIEF SUMMARY

The present disclosure relates to displaying picture-in-picture content from a memory of a set-top box. While an audio/video program is being displayed, it is sometimes desirable to concurrently display a second window alongside or within the first window ("picture-in-picture display"). By loading picture-in-picture content from a set-top box, the television provider can dynamically respond to the audio/video program with picture-in-picture content responsive to the viewer's demographics.

According to one embodiment of a method for displaying picture-in-picture content loaded from a memory of a set-top box, a plurality of advertisements are regularly transmitted to a memory of a set-top box. User data is also stored in the memory. In a first window, a first audio/video program data is output to a display from the set-top box. Identifying information about a user watching the audio/video program is then obtained and augmented with user data stored in the memory of the set-top box. Based on the augmented information, an advertisement in the memory of the set-top box is selected to display to the user and a time period in which to display the advertisement is determined. The arrangement of the first window and the second window may be determined based on the augmented information. The advertisement is output to the display in a second window and is displayed concurrently with the first window for the determined time period. In some embodiments, a plurality of content is loaded for consecutive display in a window. When the determined time period has elapsed, display of the second window is discontinued. The period to display an advertisement may be signaled by a content provider, television provider, or by any other means.

In various embodiments the first and second window may overlap, or they may not overlap. In embodiments where the first window and second window overlap, the first window may be displayed over a portion of the second window or vice-versa. The first and second windows may also be displayed side-by side in some embodiments. The audio played while the first and second window are displayed concurrently may correspond to either the first window or the second window.

If more than one user is currently watching the audio/video program, the second audio/video program displayed in the second window may be selected based on user data of each user watching. In some embodiments, a local advertisement is selected only when addressable national advertisements relevant to the demographics of the current user are unavailable.

According to another embodiment, a system for displaying picture-in-picture content loaded from a memory of a set-top box, comprises the memory of the set-top box configured to store pluralities of user data and regularly downloaded audio/video content. A display is configured to display a plurality of windows, and an audiovisual content controller is configured to output a video component of a first audio/video content to the display in a first window. A processor is configured to first obtain identifying information about a current user watching an audio/video content. Then, it determines a time period in which to display a second audio/video content stored in a memory of a set-top box having a relevance to the current user. Next, the processor generates augmented information based on user data from the memory of the set-top box and the identifying information.

The processor then selects, based on the augmented information, the second audio/video content and outputs to the display in a second window a video component of the second audio/video content from the memory of the set-top box, displaying the first window and the second window concurrently. Finally, the processor discontinues display of one of the first window and the second window.

In some implementation of the embodiment above, the processor is configured to send the augmented information to a remote server. The processor may also be configured to save the augmented information to the memory of the set-top box. The processor may be further configured to output more than two windows to be displayed concurrently. The discontinuing display of one of the first window and the second window may, in some instances, be in response to a command from an electronic device operated by the current user. The second audio/video content is in some embodiments an advertisement.

According to another embodiment of the present disclosure, a set-top box system comprises a memory configured to store pluralities of user data and regularly downloaded audio/video content, a display configured to display a plurality of windows, and a processor. The processor is configured to output to the display in a first window a video component of a first audio/video content from the memory of the set-top box. The processor is further configured to obtain identifying information about a current user watching an audio/video content and determines a time period in which to display a second audio/video content stored in a memory of a set-top box having a relevance to the current user. The processor is also configured to generate augmented information based on user data from the memory of the set-top box and the identifying information and select the second audio/video content based on the augmented information. It is also configured to output to the display in a second window a video component of the second audio/video content from the memory of the set-top box concurrently with the first window, and finally discontinue display of the first window.

DETAILED DESCRIPTION

Displaying advertisements or other content during audio/video program traditionally requires completely discontinuing display of the audio/video program while the advertisements or other content is displayed. For instance, advertisements often require the full use of a display and speakers while they are being played. As a result, a user watching the audio/video program may miss portions of live-streamed content while advertisements or other content is displayed. Alternatively, the audio/video program is paused while the user watches the advertisements. Completely discontinuing display of the audio/video program while advertisements are displayed may frustrate or distract the user from the audio/video program.

In some cases, the audio/video program contains natural breaks during which display of an advertisement or other content alongside the audio/video program may be advantageous. For instance, when a player is injured during a sports game, the sports game must be paused while the player's injury is attended to. Similarly, some vehicle races may have hundreds of laps around a track, with little variation or a professional golf game might have breaks in the action. The user may not desire to watch a relatively static shot of an injury being attended to, vehicles racing in the same configuration or players walking towards the green after striking the ball. Playing advertisements or other content alongside the audio/video program in a picture-in-picture manner allows the user to continue watching the primary audio/video program as desired, with the option of concurrently watching secondary content or even selecting to watch the secondary content full-screen.

In some instances, advertising breaks are denoted by a signal in a data stream from program distributor 116. In this case, advertisements can be selectively converted into picture-in-picture advertisements rather than full-screen advertisements. An audio/video program can be converted from full-display advertisements to picture-in-picture advertisements. This allows the user to selectively watch both the audio/video program and the advertisement.

To enable dynamic picture-in-picture display, it is advantageous to load appropriate picture-in-picture content from a local memory of a set-top box. Loading locally stored content as picture-in-picture content allows for unexpected breaks in an audio/video program to be filled with advantageously targeted content. The use of content preloaded on a set-top box for the purposes of picture-in-picture display allows the picture-in-picture content to be targeted to the user based on user data accumulated and stored in the set-top box over a potentially long period of time. By downloading a plurality of potentially relevant advertisements to the local system before they are displayed, picture-in-picture content can be carefully curated and selected to best suit the viewers' demographics, even when picture-in-picture is initiated with little or no notice.

Figure 1A:
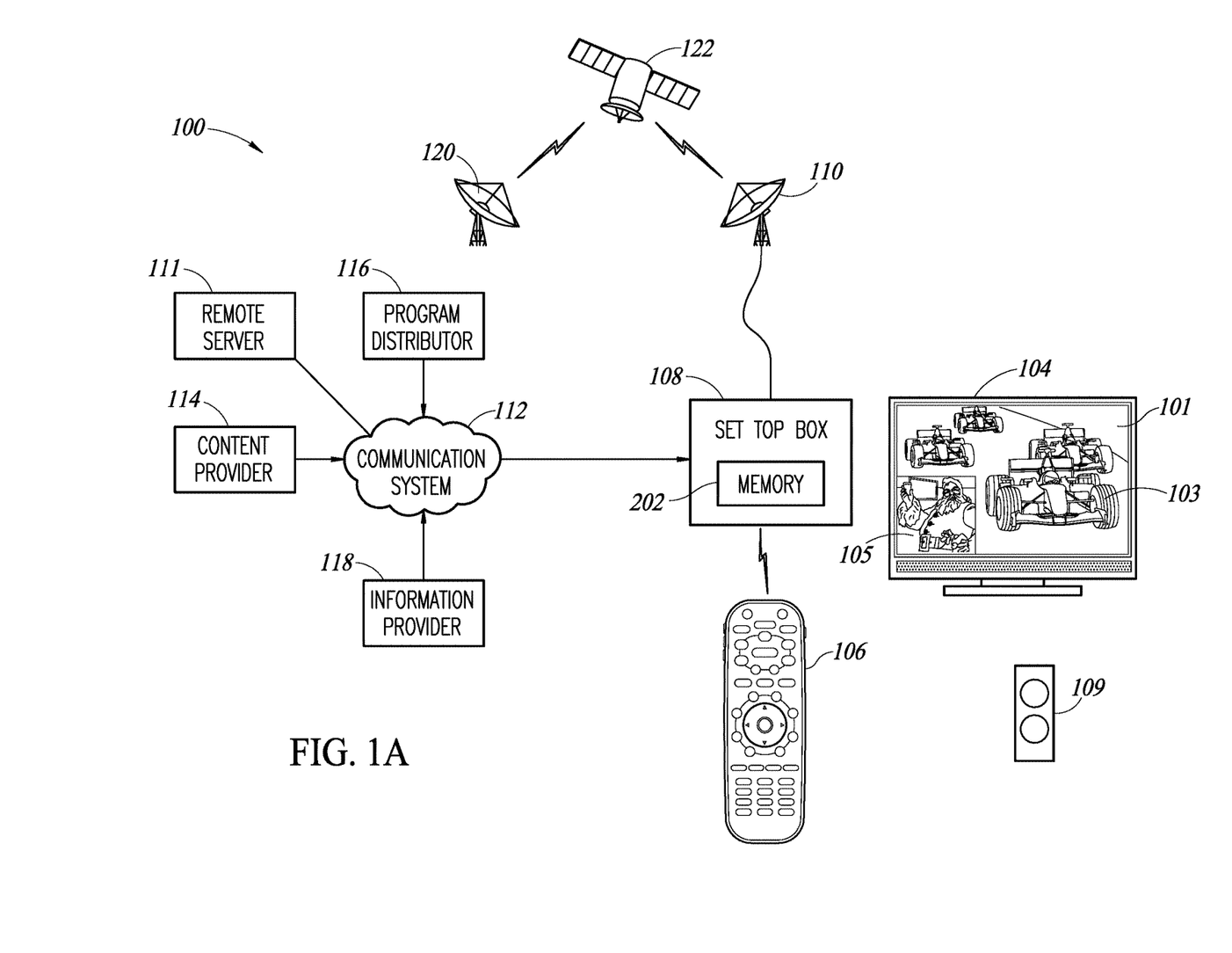
FIG. 1A is an overview of system of the present disclosure configured to display picture-in-picture content in an embodiment of the present disclosure.
Figure 1B:
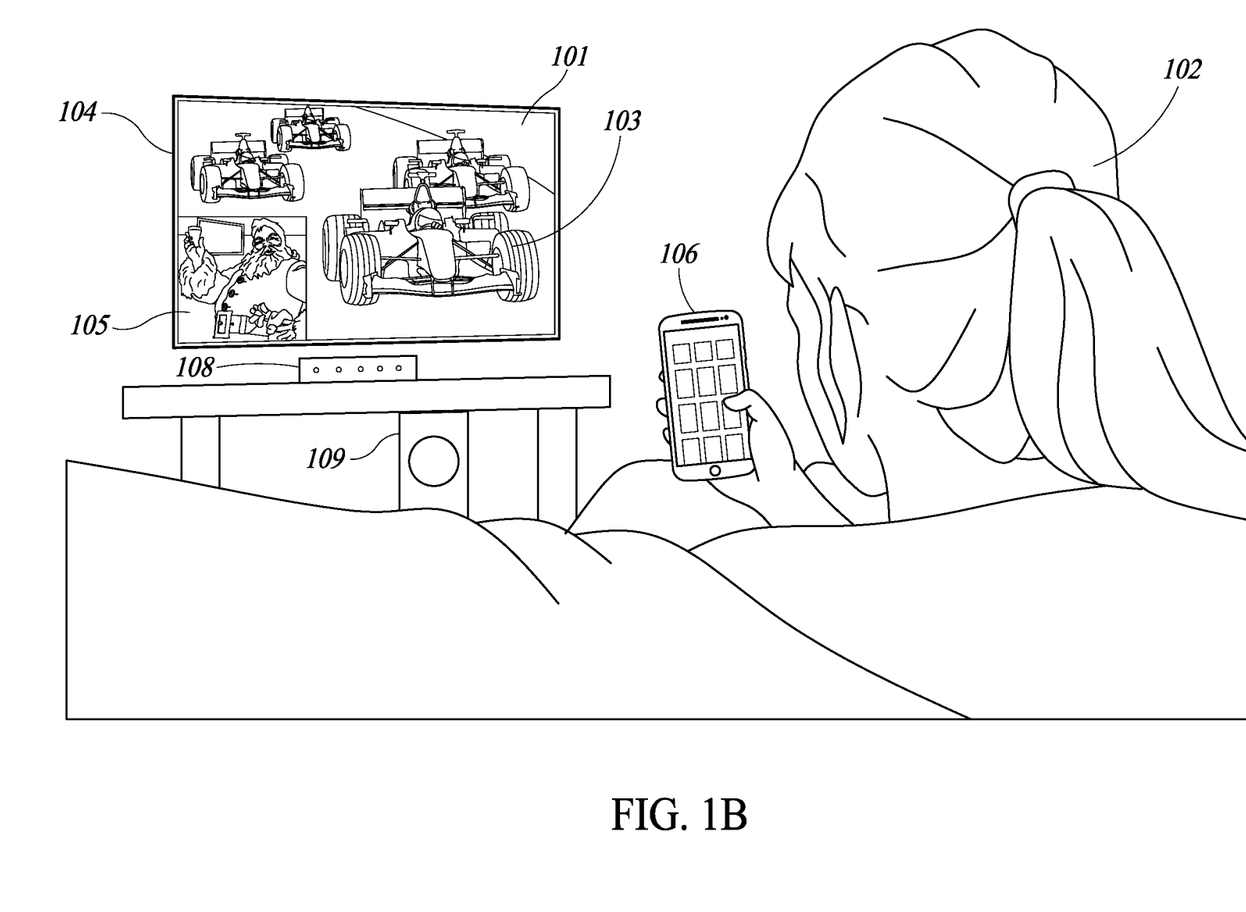
FIG. 1B shows the user interacting with a system of an embodiment of the present disclosure.

FIG. 1A shows an embodiment of a system 100 of the present disclosure. Display 104 is configured to display video content within display area 101 comprising a first window 103 and a second window 105 concurrently. Speaker 109 is configured to play an audio portion of an audio/video program. Set-top box 108 contains memory 202, which stores a plurality of advertisements. The advertisements communicated to dish 110 via satellite 122, which receives the advertisements from uplink 120. The set-top box 108 may also include a camera, a microphone, an input antenna and other components to capture and sense information about the local environment in which the TV is being viewed. There are not reference numbers provide for these components in the image 1B, but they can be considered as represented by the dots across the front.

Set-top box 108 is further configured to receive information from communication system 112. Communication system 112 may receive information from content provider 114, program distributor 116, and information provider 118.

Display area 101 displays audio/video programs provided by a set-top box 108 or other acceptable receiver and driver system. The source of the audio/video content is communication system 112, which may be the Internet, satellite dish 110, program distributor 116, information provider 118, content provider 114, or other source. The content can be referred to as content, an audio/video program, an audio video program, an A/V program, or similar nomenclature. In the circumstance of using the satellite dish 110, the signal from uplink 120 may be received via satellite 122 and delivered to the satellite dish 110 into the set-top box 108 to provide the video display 104. Display area 101 refers to the entire displayed image on display 104, comprising first window 103 and second window 105 in the embodiment depicted in FIG. 1A.

Display 104 may be a computer, a television, a projector, or the like. The first window 103 may contain an advertisement, an audio/video program, or other displayable content. The second window 105 may contain an advertisement, an audio/video program, or other displayable content. In some embodiments, display area 101 comprises a single window for a period of time. For instance, the first window or the second window may be resized to fill display area 101, with only one window being visible during the resizing.

First window 103 and second window 105 may overlap, with one window being displayed over at least a portion of the other window. In some embodiments, first window 103 is displayed over at least a portion of second window 105. In other embodiments, second window 105 may be displayed over at least a portion of first window 103. First window 103 and second window 105 may in some instances be displayed side-by-side, such that the windows do not overlap.

Speaker 109 plays audio content corresponding to the content displayed in the first window 103 or the second window 105. In some embodiments, speaker 109 is configured to play audio content not associated with either first window 103 or second window 105. Speaker 109 may be integrated into a television, a standalone speaker, headphones, or any other device suitable for audio playback.

User 102 controls display area 101 using controller 106. Controller 106 may be a smartphone or a remote control adapted to communicate with set-top box 108. Controller 106 may be configured to collect and send data about user 102 and the environment to set-top box 108. This data includes commands explicitly sent by the user to control set-top box 108, but may also include additional information about user 102 and the environment.

Memory 202 stores user data including demographic information, identifying information, watch history, or other information. Memory 202 also stores a plurality of audio/video programs that can be loaded on demand and displayed on display 104. The plurality of audio/video programs may include advertisements but are not limited to advertisements, and in some embodiments include whole or excerpted movies, television shows, or any other displayable content.

Set-top box 108 is configured to obtain identifying information about a user 102 watching an audio video program on display 104. Set-top box 108 may detect user 102's personal electronic device using near-field communication, Bluetooth, local area network, or any other suitable standard. User 102's personal device may contain information such as the identity of the user, email accounts, social media accounts such as Twitter, Facebook, and other accounts which are personal to the user and provide the identity of the user. The personal device in many cases also includes a user recognition device, such as a fingerprint sensor, a facial recognition sensor, an iris sensor, or some other sensor whereby the user is accurately and personally identified. In addition, the personal computing device will be associated with a number of other computing devices, social media accounts, smart devices, and applications stored either locally or in the cloud that are associated with the user 102. For example, the personal device may be associated with the user via a common Google account which may include the set-top box 108, other smart TV, smartphone, smartwatch, or personal computing device.

The set-top box 108 can obtain information about the user directly from the personal device. When the personal device is used as the controller, this information can be obtained as part of the communication to control the set-top box 108. It can also be obtained by an exchange of data using a separate antenna, Bluetooth, NFC or other technique when the personal device is not performing the function of the controller 106.

Additionally, set-top box 108 can use watching habits to identify a user personally or to identify a demographic of the user. For instance, if an audio/video program is paused and later resumed, it is likely that the same user is watching in both instances and the set-top box can use information stored about that user to identify the current user.

Remote server 111 is in some embodiments configured to receive information from set-top box 108. Set-top box 108 in some instances sends information to remote server 111 including identifying information, watch history, input commands by controller 106, information related to a personal device, or other user data. Remote server 111 may process this information to determine which advertisements to download to the set-top box 108, or to supplement user data stored in the set-top box memory 202.

Content provider 114 provides program content, such as television content, to a distributor, such as the program distributor 116. Example program distributors include, but are not limited to, satellite and cable television service providers. Example content providers include television stations which provide local or national broadcast television programming and special content providers which provide premium-based programming, streaming services, pay-per-view programming and on-demand programming.

Program content (i.e., a program including or not including advertisements), is communicated to the program distributor 116 from the content provider 114 through suitable communication media, generally illustrated as communication system 112 for convenience. Communication system 112 may include many different types of communication media including those utilized by various different physical and logical channels of communication, now known or later developed. Non-limiting media and communication channel examples include one or more, or any operable combination of: satellite systems, cable systems, fiber optic systems, microwave systems, asynchronous transfer mode (ATM) systems, frame relay systems, digital subscriber line (DSL) systems, radio frequency (RF) systems, telephone systems, cellular systems, and the Internet.

In at least one embodiment, the received program content is converted by the program distributor 116 into a suitable signal (a "program signal") that may be ultimately communicated to the set-top box 108 as a program content stream. Various embodiments of the set-top box 108 may receive programming from program distributors 116 and/or directly from content providers 114 via locally broadcast radio, RF signals, cable, fiber optic, Internet media, or the like, via the communication system 112.

In addition, information provider 118 may provide various forms of content and/or services to set-top box 108. For example, information provider 118 may provide information to the set-top box 108 regarding customer or user accounts associated with the program content stream and/or set-top box 108; corresponding user preferences and settings; EPG information; and/or additional processing of the EPG information to enable the set-top box 108 to: obtain identifying information about the user; determine locally stored content with a relevance to the user based on the identifying information; and display picture-in-picture content comprising an audio/video program window. Such services may include artificial intelligence and machine learning functionality to improve the user preference determination based on a feedback loop including information regarding viewing habits from the set-top box 108.

Uplink 120 transmits content to set-top box 108 via satellite 122 to satellite dish 110. The transmitted content is stored for later display in set-top box memory 202. The content transmitted is in some instances a plurality of advertisements but may be any audio/video content. In one embodiment, uplink 120 periodically transmits content to set-top box 108 nightly, weekly, or at some other periodic interval. This content can include advertisements to be presented at future date to the user, as explained elsewhere herein. The content to transmit may be selected based on user demographic information transmitted to remote server 111 by set-top box 108 via communication system 112. For example, set-top box 108 may, in some instances, gather sufficient identifying information to uniquely identify user 102 and transmit user 102's personal identity and other data to remote server 111. In this case, additional information associated with user 102's personal identity can be used to more accurately determine content targeting user 102's demographics. In another embodiment, the user data transmitted to remote server 111 is based on identifying information that is insufficient to uniquely identify a user but places the user within one or more demographic groups. A user may be identified as living in a particular region, for example, and content relevant to users in that region can be transmitted to set-top box 108. In another embodiment, remote server 111 determines demographic information about user 102 without using data from set-top box 108. For example, server 111 may direct uplink 120 to transmit content based on a position of satellite 122 relative to Earth such that the content is relevant to a demographic of a geographical region serviced by satellite 122.

FIG. 1B shows user 102 interacting with an embodiment of the present disclosure. User 102 watches display area 101 on display 104. On occasion, it may be advantageous to display an advertisement or other content to user 102. For instance, in the middle of a long car race as shown in first window 103, it may not be important for user 102 to have a continuously unobstructed view of display area 101. In another example, a player in a sports game may be injured on the field. In this instance, display area 101 may comprise several minutes of an injured player laying on the field as the sports game is paused. In the examples above, user 102 may begin to lose interest in the primary audio/video program but may still desire to watch the program should it change. Initiating picture-in-picture content comprising a first window 103 and a second window 105 allows additional content to be displayed. In some embodiments, the primary audio/video program is displayed in either first window 103 or second window 105, allowing user 102 to selectively watch the primary audio/video program as well as the secondary content. For instance, user 102 can continue watching a car race in the first window 103 while also watching an advertisement in a second window 105.

Set-top box 108 determines a time to display picture-in-picture content to user 102. Set-top box 108 may determine the time to display picture-in-picture content using a signal obtained from communication system 112. Program distributor 116, for example, may insert a command into the program data stream using a protocol such as SCTE-35 indicating to set-top box 108 that an advertising break should be initiated.

In some embodiments, set-top box 108 independently determines a time to display picture-in-picture content. For instance, set-top box 108 can compare frames of the display area 101 over time and initiate picture-in-picture display if the frames are similar within a certain threshold during a period. High similarity between frames may indicate that display area 101 is predictable and may not maintain or require user 102's attention. In other embodiments, set-top box 108 can display picture-in-picture content at times that optimize for other characteristics of the primary audio/video content or user 102. It may be advantageous, for example, to display picture-in-picture content at the beginning of an audio/video program when user 102 may still be deciding if they would like to watch the current audio/video program or watch a different program.

Set-top box 108 collects and stores identifying information about user 102 that can be used to determine the content to be displayed in first window 103, second window 105, or both windows. Identifying information may include demographic information, audio/video program watch history, internet search history, etc. The set top box may also collect information about the local environment in which the image is being displayed and viewed. It may wish to collect information about the number of people watching, their interest in the program, local sounds besides from its own audio track, data and signals from local smart devices of current viewers and other information. In order to collect this information, the set-top box 108 may include a camera, a microphone, an input antenna and other components to capture and sense information about the local environment in which the TV is being viewed, which components are shown as round dots in FIG. 1B, but there are not reference numbers for these components in this image for simplicity and to avoid clutter. The identifying information can be used to select an advertisement stored in the set-top box memory 202 to display to user 102 in the first window 103 or the second window 105. In other embodiments, the identifying information can be used to select a second audio/video program like a movie, a television show, a sports event, or any other displayable audio/video content.

Once set-top box 108 has determined the second content to be displayed, the first window 103 and the second window 105 are displayed concurrently. In some instances, the first window 103 shows an audio/video program such as a television show, a sports game, or other displayable content and the second window shows an advertisement.

Speaker 109 is configured to play an audio component of an audio/video content corresponding to video content displayed in a picture-in-picture window. During picture-in-picture display, speaker 109 may play audio corresponding to the first window or the second window. When an advertisement is displayed in a second window concurrently with an audio/video program in a first window, speaker 109 may play an audio component corresponding to the audio/video program or the advertisement. Speaker 109 may also play instructions imploring user 102 to interact with the content. For instance, controller 106 can be used to configure and arrange the relative sizes, positions, and arrangements of the plurality of picture-in-picture windows. For example, a user 102 viewing a first window 103 and a second window 105 may select one of the windows to be displayed in full-screen mode and discontinue display of the other window. In another embodiment, the user 102 uses controller 106 to change the relative sizes of the first window 103 and second window 105. In some embodiments, the user 102 can change the arrangement of the first window 103 and the second window 105 such that, for instance, the first window is displayed over at least a portion of the second window or vice versa. In some embodiments, the user may toggle an audio source such that speakers 109 play an audio portion corresponding to either the first window 103 or the second window 105.

Commands transmitted to set-top box via controller 106 may be stored in memory 202 of the set-top box 108 and may be used as identifying information for purposes of determining picture-in-picture content to display in the future. In many instances the user's personal device will be used as the controller 106 for the set-top box 108, therefore the controller 106 can be considered as being user's personal computing device as shown in the example of FIG. 1B. Examples of the user's personal device include a smart phone, smart watch, electronic notebook or other personal computing device.

Figure 2:
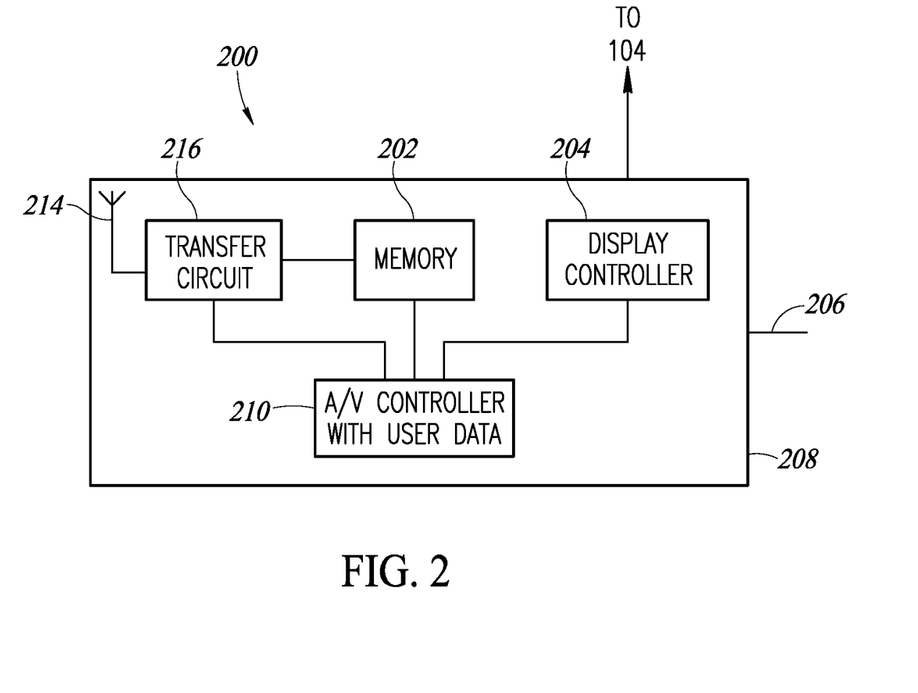
FIG. 2 shows selected features of a set-top box in an embodiment of the present disclosure.

FIG. 2 shows selected features of set-top box 200 according to one embodiment. Set-top box 200 is contained in housing 208. Communication link 211 can be any acceptable link such as any wireless including Wi-Fi, Bluetooth, or the like, or a hardwire cable connection or the like. Antenna 214 allows for wireless communication between the set-top box and communication system 112. Transfer circuit 216 routes information received by the set-top box to memory 202 or audio/video controller 210. Information received by the set-top box 200 is routed to memory 202 if the information is to be displayed later. For example, advertisements periodically received by the set-top box 200 are routed by transfer circuit 216 to memory 202 such that they can be played back later. The set-top box 108 will often receive updates from the satellite system a few times a week or sometimes each night. As one example, the set-top box 108 can be programmed to connect to the satellite system at 2:00 a.m. each night when it is not likely to be used and there is a large amount of bandwidth available. The uplink 120 or the communication system 112 will transmit content to set-top box 108 nightly, weekly, or at some other periodic interval. This content can include advertisements to be presented at future date to the user, as explained elsewhere herein. Streamed audio/video programs, however, may be routed for immediate display by transfer circuit 216 to audio/video controller 210 and then to display controller 204, which controls display 104. The audiovisual controller 210 and display controller 204 can be any acceptable processors of the many known in the art. These are of a type commonly used in set-top boxes. In this way, the set-top box 200 can receive information to display immediately or store in memory for later display.

Figure 3A:
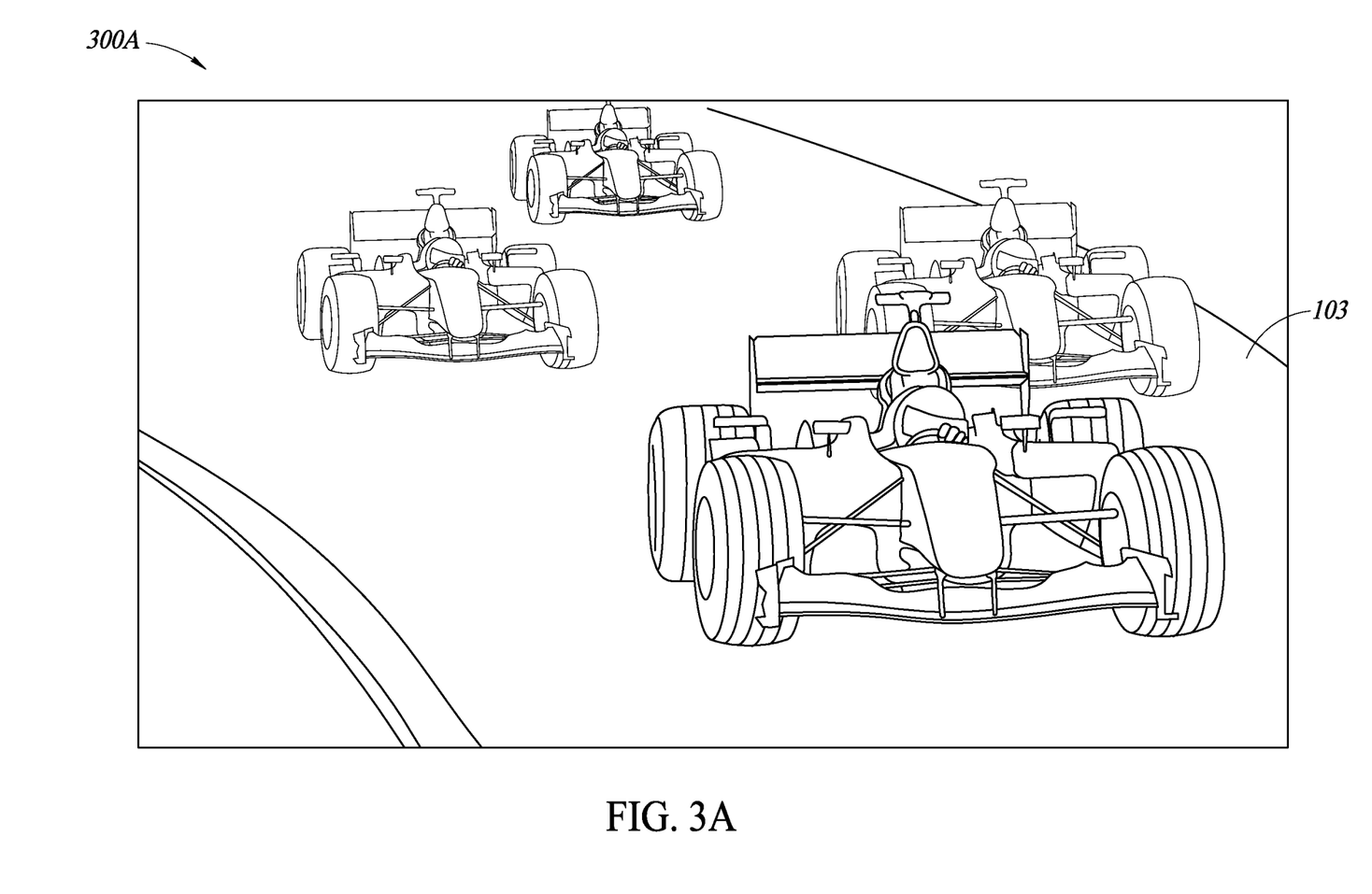
FIG. 3A shows a single content window in an embodiment of the present disclosure.

FIG. 3A shows an embodiment of a picture-in-picture display 300A with only one window 103. This corresponds to a user watching an audio/video program before a second window 105 is displayed. As described above, the set-top box 108 determines a time in the audio/video program to initiate picture-in-picture display. In FIG. 3A, set-top box 108 has not yet initiated picture-in-picture display but is monitoring the audio/video program data stream to determine if there is an instruction to initiate an advertising break or if the audio/video program data stream meets other criteria described above for initiating picture-in-picture display.

Figure 3B:
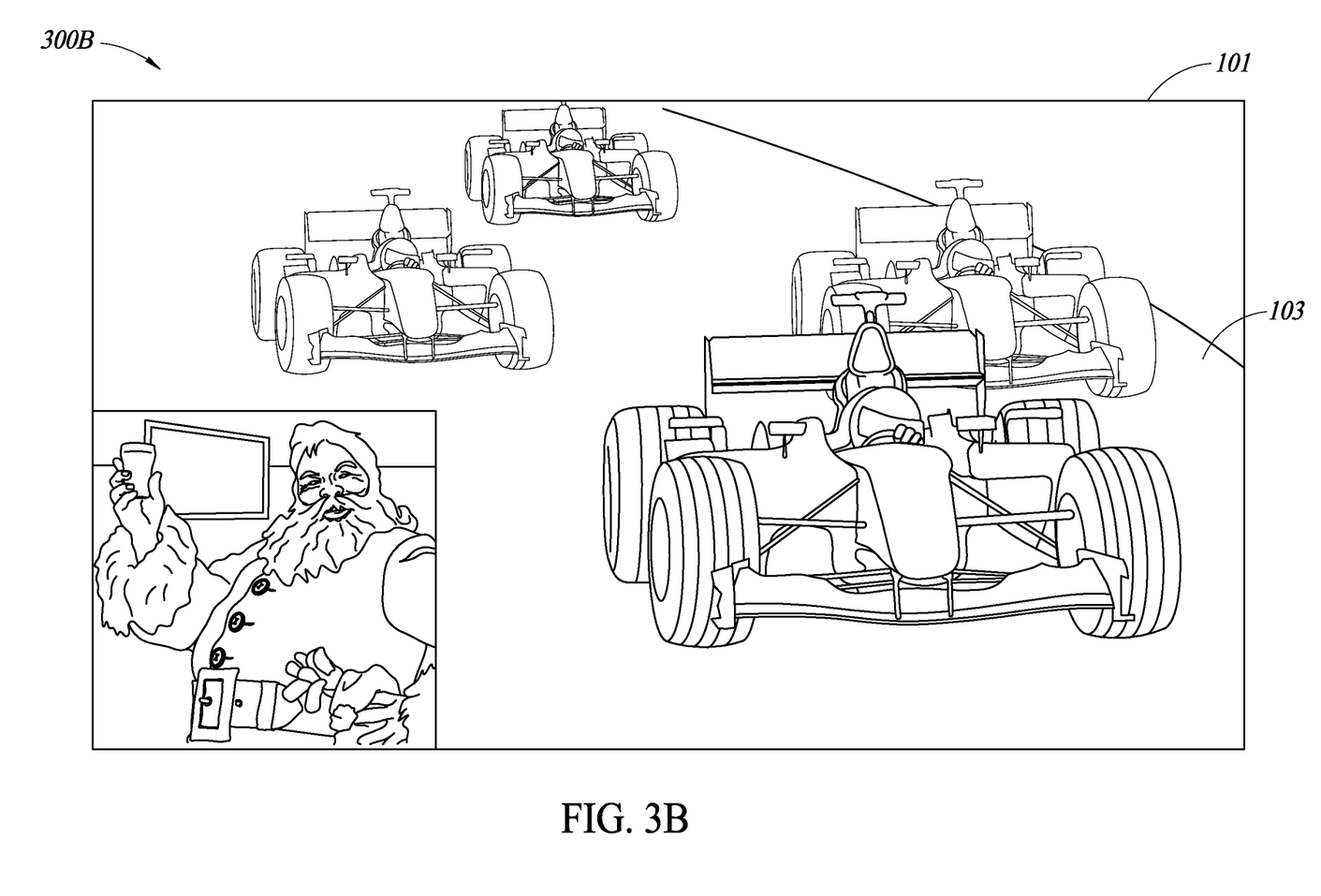
FIG. 3B shows picture-in-picture content wherein two windows are displayed concurrently, with a second window being displayed over a first window in an embodiment of the present disclosure.

FIG. 3B shows an embodiment of a picture-in-picture display 300B wherein a second window 105 containing an advertisement is displayed, at least in part, over a first window 103. The second window 105 may overlap any portion of the first window 103. For example, the second window 105 may be displayed over a corner of the first window 103. Alternatively, the second window 105 may be displayed over any portion of the first window 103 and in any position. The second window 105 is, in some embodiments, another audio/video program. In some embodiments, the audio played by speakers 109 changes to correspond with the video portion of the content displayed in the second window 105. The aspect ratios of content displayed in the first window 103 and the second window 105 may, in some embodiments, be preserved.

In some embodiments, the content displayed in the first window 103 or the second window 105 is a dynamically cropped version of the original video. For instance, a picture-in-picture display of a sports game may comprise a scoreboard or simply a reduced field of view as compared to the original content.

In still other embodiments, the content displayed in a picture-in-picture window may comprise a written transcription of the content audio, a machine-generated description of the content video, or a machine-generated preview, highlight clip, excerpt, or other summary of the content video. For example, the second window 105 may contain a machine-generated preview of an audio/video program the set-top box has determined user 102 may be interested in watching. By watching the preview in a second window, user 102 can quickly surmise if they would like to switch to watching the recommended content in the second window or the currently displayed primary content in the first window and respond with a command indicating their preference using controller 106. Selecting a window with controller 106 may take the user to a website where the user can purchase or learn more about the displayed content. Alternatively, set-top box may continue playing the secondary content full-screen from the point displayed, or begin playing the full audio/video program from the beginning. The first content displayed in the first window 103 may be summarized in a relatively small window as described above in the foreground while the second content displayed in the second window 105 is displayed full-screen in the background, or vice-versa.

Figure 3C:
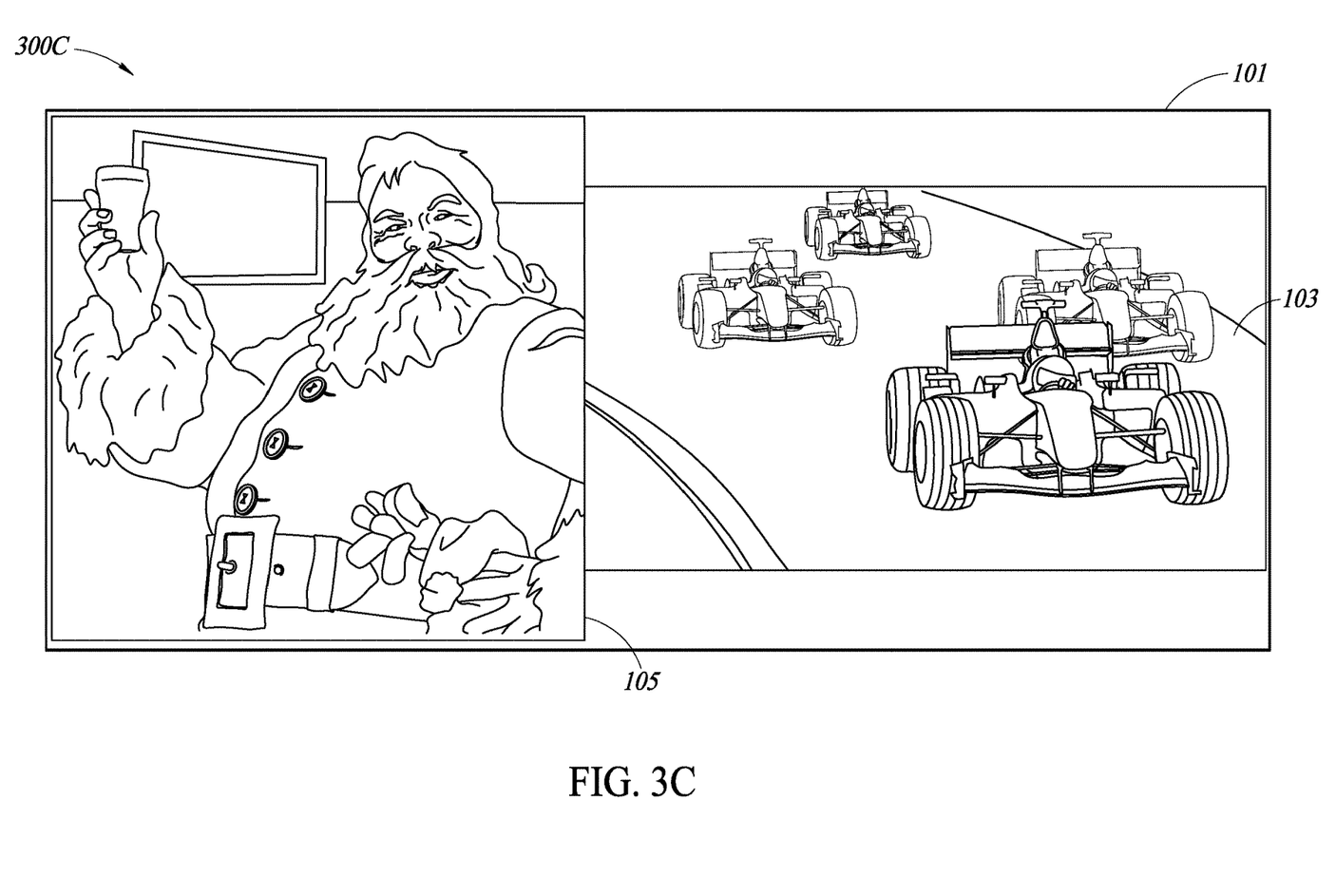
FIG. 3C shows picture-in-picture content wherein two windows are displayed concurrently side-by-side in an embodiment of the present disclosure.

FIG. 3C shows an embodiment of a picture-in-picture display 300C wherein the first window 103 and a second window 105 are displayed such that they do not overlap. The sizes of the first window 103 and second window 105 may be selected such that one or both of the aspect ratios of the first window 103 and the second window 105 are preserved. The first window 103 and the second window 105 together may span the entire horizontal or vertical length of the display 104. In other embodiments, the first window 103 and the second window 105 are sized and arranged such that they do not span the entire horizontal or vertical length of the display 104. One or both of the windows may display a summary of the content as described above.

Because the first window 103 and the second window 105 may not cover the entire display area 101, any suitable content may be displayed in display area 101 of the display not covered by the first window 103 and the second window 105. Display area 101 may comprise static or video content and may be decorative, informational, or promotional in nature. For instance, smaller banner advertisements or information about the content being played in the second window 105 may be displayed in display area 101.

Figure 4:
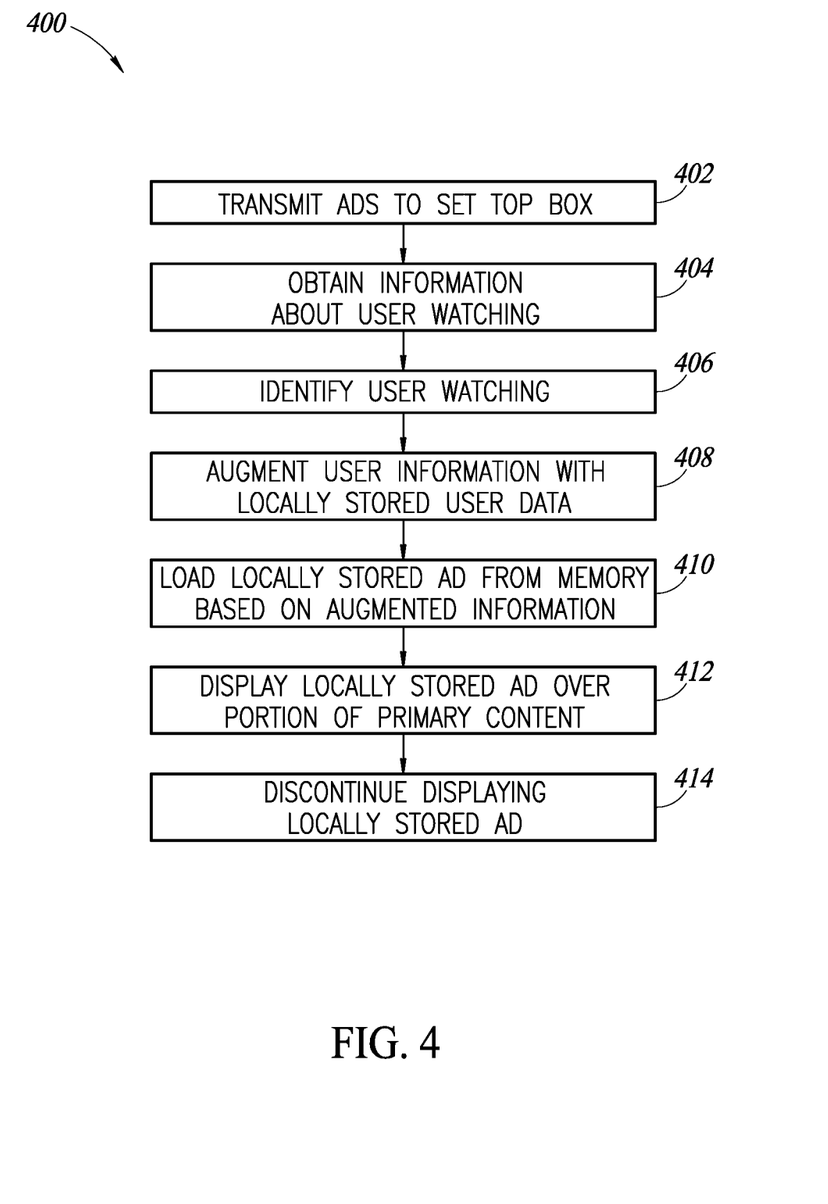
FIG. 4 is a logical flow diagram showing an embodiment of a method for displaying picture-in-picture content.

FIG. 4 is a logical flow diagram showing the operation of one embodiment of the inventive picture-in-picture display method. The process begins at 402 wherein advertisements are transmitted to a set-top box, which can be done once a day or a few times a week via the uplink 120 as previously described. Then, at 404, the set-top box obtains information about the user watching an audio/video program. The information is then used to identify the user watching at 406. At 408, information about the user watching is augmented using locally stored user data. The memory 202 therefore has information about the advertisements it has currently stored in its memory 202 and also information about the current user. Then, an advertisement stored locally in a memory 202 of the set-top box is selected based on the augmented information at 410. The current local content containing the advertisements were stored during a prior download from uplink 120 or the communication system 112, as described elsewhere herein. At 412, the selected advertisement is displayed over at least a portion of the audio/video program. Finally, at 414, the advertisement is no longer displayed.

At 408, locally stored user data is used to augment user information obtained by set-top box 108. Aspects of this augmentation may be performed by household, or by individual user. For example, users in a same household may share many demographic features, including geographic location, interests, income, age, and the like. Therefore, data with potential applicability to multiple users in the same household can be automatically added to information contemporaneously collected by set-top box 108 during a user's viewing session. Additionally, set-top box 108 may be able to determine user data relating to the current user in particular. For instance, if the presence of a personal device is associated with a user, set-top box 108 can identify the user by the presence of the personal device. Then, user data stored about that user can be used to augment the contemporaneous information obtained by set-top box 108.

Based on the augmented information, set-top box 108 selects and loads a locally stored advertisement at 410. In some instances, more than one user may be watching the audio/video program. Set-top box 108 may take this into account while making a selection by weighting user data of the multiple users, selecting an advertisement based on general information about the household, or by simply ignoring user data about one or more of the users. For example, if multiple members of a household are watching an audio/video program, it may be advantageous to select advertisements of users having an income in some instances, users in school in other instances, and so on. Alternatively, household interests may be substantially aligned such that advertisements with some relevance to more than one user can be selected, such as an advertisement for a restaurant located near the users' home.

Instead of attempting to find advertisements with a degree of relevance to each of multiple users, such as by weighting the preferences of multiple users, advertisements may in some embodiments be selected according to the user data of only one user. In some instances, set-top box 108 varies the user data considered before displaying an advertisement, such that some advertisements are relevant to one user, while other advertisements are relevant to another user. If user data indicates that one user watching is interested in football, while another user watching is interested in golf, for example, it may show only advertisements about golf or football, or it may alternate showing advertisements about golf and advertisements about football.

Figure 5:
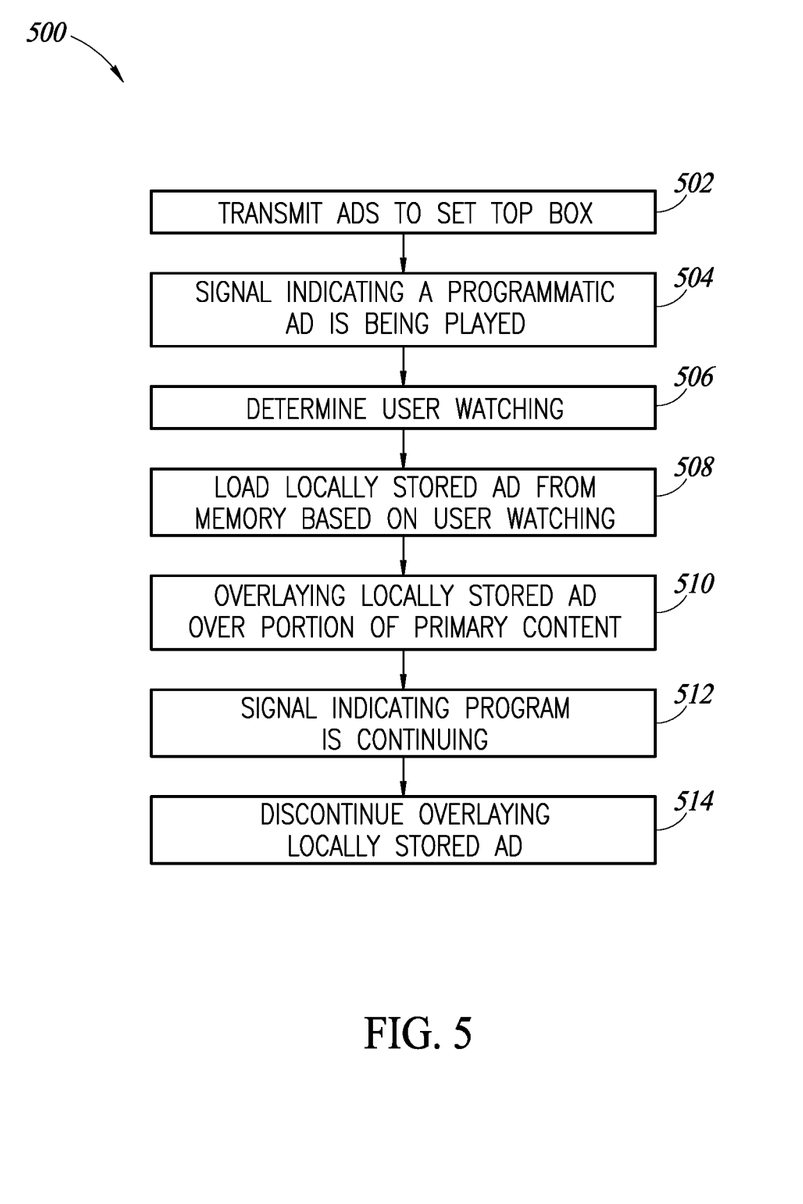
FIG. 5 is a logical flow diagram showing an embodiment of a method for displaying picture-in-picture content.

FIG. 5 is a logical flow diagram showing the operation of another embodiment of the inventive picture-in-picture display method. It will be described with relation to elements depicted in FIG. 1B. At 502, advertisements are transmitted to a set-top box 108. Then, at 504, set-top box 108 obtains a signal indicating a programmatic advertisement is being played. At 506 the user is identified. Set-top box 108 loads a locally stored advertisement based on the user watching at 508. At 510, set-top box 108 overlays the locally stored advertisement over a portion of the primary content being displayed. The system selects an advertisement from set-top box memory 202 based on the identifying information. This locally stored ad is therefore played in place of the programmatic ad that was provided to the national audience. At 510, the selected advertisement is displayed in a second window over at least a portion of the audio/video program based on the identifying information at 510. At 512, the system obtains a signal indicating the primary content is continuing. Display of the advertisement is discontinued at 514.

The signal indicating a programmatic advertisement is being played at 504 in some instances originates from content provider 114, program distributor 116, or information provider 118. But because advertisements are stored locally in memory 202, set-top box 108 may initiate playing an advertisement at a time determined by set-top box 108 alone and does not need to rely on externally generated signals arriving via communication system 112 or otherwise to initiate playing a picture-in-picture advertisement.

The user identification at 506 may in some cases personally identify the user. In other instances, the user will be identified as a member of a demographic. The identification may be made using information collected from a personal device of the user, information stored in memory 202, or information collected by set-top box 108, such as through use of a camera as discussed above.

When set-top box 108 loads a picture-in-picture advertisement from local memory 202 at 508, only set-top box 108 has access to the advertisement being played. Set-top box 108 will therefore periodically report the ads it has played to the program distributor, content provider, information provider, or other relevant entity through communication system 112. In some embodiments, set-top box 108 periodically reports the advertisements it has played to a program distributor. The program distributor can use this report to facilitate remuneration for advertisements played from the local memory of set-top box 108. For example, set-top box 108 may independently determine to insert a locally stored picture-in-picture advertisement for golf balls while user 102 is watching a golf tournament. At the time it is played, the program distributor will be unaware that this picture-in-picture advertisement was displayed. Set-top box 108 stores the relevant data regarding all ads that is has shown to a user and reports advertisements displayed back to the program distributor via communication system 112. These reports may be sent on advertisement-by-advertisement basis, as each advertisement is displayed, or set-top box 108 may display a plurality of advertisements between reports, with each report having information about the plurality of advertisements previously displayed. It might report the ads instantly after being displayed or compile a list and report them once a week. Discontinuing display of the locally stored picture-in-picture advertisement at 514 may, in some instances, cause set-top box 108 to compile and send a report.

The reports may include further information about display of the advertisement, such as the size and configuration of the picture-in-picture advertisement, the time at which it was displayed, user interactions with the advertisement, and identifying information set-top box 108 processed in determining to display displayed the picture-in-picture advertisement. In some instances, set-top box 108 keeps a list of advertisements displayed and monitors user behavior to determine whether the user interacted with the advertisements or the subject matter of the advertisements during or after display of the advertisement.

After display of the locally stored advertisement is performed at 510, according to some embodiments, the process may return to 504 to select and display another advertisement before reaching 512. This may occur, for example, when the set-top box does not obtain a signal indicating the audio/video program is continuing before the first advertisement has ended. In this instance, set-top box 108 can determine another advertisement to display while waiting for a signal indicating the program is continuing. In this way, a plurality of picture-in-picture advertisements may be displayed consecutively.

The signal indicating the program is continuing at 512 may be based on user input via controller 106, determined by set-top box 108, communicated to the set-top box via communication system 112, or any other available information. Set-top box 108, according to some embodiments, determines a time to discontinue picture-in-picture display. This may be done, for instance, by analyzing the change across frames of the primary content across time. While a player is injured on the field, frames depicting the injured player may be similar for the duration of the interruption. However, when the game resumes, frames of the game being played may be substantially different compared to frames of the injured player. By analyzing the change in displayed content over time, set-top box 108 in some embodiments determines when the primary audio/video program is no longer repetitive or similar and discontinues picture-in-picture display such that the user can focus more fully on the changing audio/video program.

In some embodiments, set-top box 108 determines a program is continuing at 512 a user presses a button on controller 106 such as to change a channel, or another change in the environment occurs. In some instances, 512 is satisfied when the advertisement being displayed ends.

Figure 6:
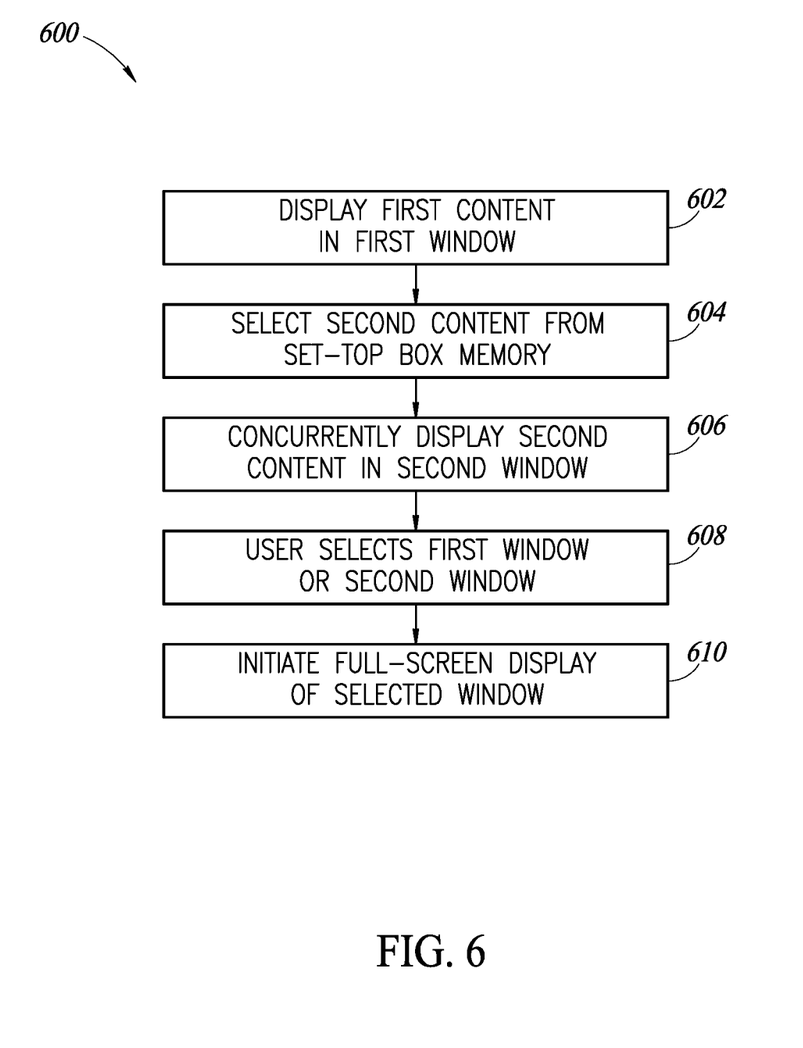
FIG. 6 is a logical flow diagram showing an embodiment of a method for displaying picture-in-picture content wherein the user selects one of the picture-in-picture windows for full-screen display.

FIG. 6 is a logical flow diagram showing the operation of another embodiment of the inventive picture-in-picture display method. It will be described with relation to elements depicted in FIG. 1B. At 602, content is displayed in a first window 103. Then, at 604, second content is selected and loaded from memory 202. At 606, the second content is displayed in a second window 105 concurrently with the first widow. Using controller 106, user 102 may select either the first window or the second window at 608. The selected window will then be displayed full-screen, while the other window will no longer be displayed at 610. For instance, if user 102 selects first window 103 featuring a car race, first window 103 will be displayed alone as shown in FIG. 3A. If second window 105 is selected, second window 105 will be displayed alone.

The content loaded at 602 may be an advertisement or any other content suitable for display as discussed with respect to FIG. 3B above. If an advertisement is being displayed in second window 105, user 102 selecting second window 105 where the advertisement is displayed may initiate full-screen display of the advertisement, or initiate display of additional information about the product being advertised, such as an online product purchase page. The content loaded at 602 may also be excerpted from any suitable audio/video program such as a television show, a movie, or a user-generated video. The content may be a machine or human-generated thumbnail video featuring portions of a larger audio/video program. Where the content in the selected window is excerpted from a larger audio/video program, the full-screen audio/video program may begin playing from the time of the excerpted portion, or from the beginning of the audio/video program. If user 102 must purchase the excerpted audio/video program, they may be permitted to continue watching the excerpt for a period of time before being prompted to purchase the excerpted audio/video program to continue watching.

Similarly, the second content loaded from set-top box memory at 604 may be any of the forms of content described with respect to the first content loaded at 602. The types of the first content and second content may be the same or different. For example, the first content and second content may in some instances both be movies or movie excerpts. In other cases, the first content may be audio/video program such as a television show, while the second content is an advertisement.

At 606, when the first and second windows are concurrently displayed, the first and second window may be displayed in any configuration as described with respect to FIG. 3B or FIG. 3C. In some instances, the size, position, or configuration of the first window and the second window may vary during the time in which they are displayed. For example, an advertisement in a second window may at first be displayed over a significant portion of a first window, but later be displayed over only a small portion of the first window. Similarly, the second window may in some cases be displayed over a portion of the first window at first, while later the first window is displayed over a portion of the second window.

At 608, the user selects the first window displaying the first content or the second window displaying second content. This may be done using voice command, activating a sensor in controller 106, or by any other appropriate means. If the user is intently focused on one window, they may not wish to provide feedback via controller 106 or other explicit means. In these instances, set-top box 108 may automatically select the first window or the second window. For example, a camera integrated into set-top box 108 may track the user's eyes to determine which window they are focused on and selects the appropriate window for the user. Alternatively, if the second window is displaying an advertisement, set-top box 108 may determine automatically that the user wishes to continue viewing the content in the first window absent further instruction from the user.

Set-top box 108 may, according to some embodiments, record information about the user selecting the first window or the second window. For example, an advertiser may wish to know if a user chooses to view their advertisement over an audio/video program. By recording information about which window is selected, set-top box 108 can later report this information to the advertiser or a program provider via communication system 112. In some instances, the information is stored in memory 202 and used to later identify the user. If a user selects a window for full-screen display, it may indicate that set-top box 108 can display similar content in a larger picture-in-picture window in the future, for example.

Full-screen display of the selected window at 610 may continue displaying the same content as was displayed in picture-in-picture mode, or it may display related content. For example, if a user selects an advertisement for full-screen display, the user may wish to visit a webpage associated with the advertisement instead of watching the rest of the advertisement. Set-top box 108, then, may display content from an advertiser website, in place of, or in addition to, the locally stored advertisement. In some instances, information about the advertisement is also stored locally in memory 202 and can be loaded from there. In other instances, only a link to a product webpage or the like is stored locally, and the set-top box must navigate to the webpage using the link to access the related content.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed:

1. A method for displaying picture-in-picture content loaded from a memory of a set-top box, comprising:
   tracking whether a user selected full-screen display for a previous picture-in-picture advertisement displayed to the user;
   storing, in the memory of the set-top box, a plurality of advertisements including the previous picture-in-picture advertisement and user data, wherein the user data includes an indication that the user selected full-screen display for the previous picture-in-picture advertisement;

outputting, from the set-top box to a display, audio/video program data to be displayed in a first window;
obtaining identifying information about the user watching the audio/video program;
augmenting the identifying information with the user data stored in the memory of the set-top box;
determining, based on the augmented information, an advertisement in the plurality of advertisements to display to the user;
determining, based on the augmented information, whether the advertisement is similar to the previous picture-in-picture advertisement;
based on determining that the advertisement is similar to the previous picture-in-picture advertisement:
determining a display size of a second window to be displayed concurrently with the first window based on the full-screen display being selected for the previous picture-in-picture advertisement;
comparing video frames of the audio/video program;
determining whether the video frames are within a similarity threshold;
in response to determining that the video frames are within the similarity threshold during a period of the audio/video program:
outputting, from the set-top box to the display, the advertisement to be displayed in the second window having the display size of the second window that is to be concurrently displayed with the first window;
while the advertisement is being output to be displayed in the second window, determining whether the video frames satisfy a difference threshold; and
in response to determining that the video frames satisfy the difference threshold, discontinuing output of the advertisement causing display of the second window to cease.

2. The method of claim 1, wherein the first window and the second window overlap.

3. The method of claim 1, wherein the first window and second window do not overlap.

4. The method of claim 1, wherein the first window and the second window are displayed side-by-side.

5. The method of claim 1, wherein the second window is displayed over a portion of the first window.

6. The method of claim 1, wherein the first window is displayed over a portion of the second window.

7. The method of claim 1, wherein audio played while the first window and the second window are displayed simultaneously corresponds to the audio/video program displayed in the first window.

8. The method of claim 1, wherein more than one user is watching the audio/video program and the advertisement to display is determined based on user data of each user watching.

9. The method of claim 1, wherein determining the advertisement to display comprises:
determining, using the augmented information, that addressable national advertisements relevant to demographics of the user are unavailable; and
determining a local advertisement to display.

10. The method of claim 1, wherein a period during which to display the advertisement is signaled by a content provider.

11. The method of claim 1, wherein a period during which to display the advertisement is signaled by a television provider.

12. The method of claim 11, wherein a plurality of advertisements is loaded from the memory and displayed consecutively in the second window during the period in which to display the advertisement.

13. The method of claim 1, wherein an arrangement of the first window and the second window is determined based on the augmented information.

14. A system for displaying picture-in-picture content loaded from a memory of a set-top box, comprising:
the memory of the set-top box configured to store user data;
a display configured to display a plurality of windows;
an audiovisual content controller configured to output a video component of a first audio/video content to be displayed in a first window of the display; and
a processor configured to:
track a display size that a user selected for previous picture-in-picture content that was displayed to the user;
obtain identifying information about the user watching the first audio/video content;
generate augmented information based on user data from the memory of the set-top box and the identifying information;
select, based on the augmented information, a second audio/video content;
determine, based on the augmented information, that the second audio/video content is similar to the previous picture-in-picture content;
in response to determining that the second audio/video content is similar to the previous picture-in-picture content:
selecting a display size of a second window to be displayed concurrently with the first window based on the tracked display size for the previous picture-in-picture content;
compare video frames of the first audio/video content;
determine whether the video frames are similar within a similarity threshold;
in response to determining that the video frames are within the similarity threshold during a period of the audio/video program:
output to the display a video component of the second audio/video content to be displayed in the second window having the display size of the second window that is to be concurrently displayed with the first window;
while the second audio/video content is being displayed in the second window, determine whether the video frames satisfy a difference threshold; and
in response to determining that the video frames satisfy the difference threshold, discontinue display of one of the first window or the second window.

15. The system of claim 14, wherein the processor is further configured to send the augmented information to a remote server.

16. The system of claim 14, wherein the processor is further configured to output more than two windows to be displayed concurrently.

17. The system of claim 14, wherein the processor is further configured to save the augmented information to the memory of the set-top box.

18. The system of claim 14, wherein discontinuing display of one of the first window or the second window is in response to a command from an electronic device operated by the current user.

19. The system of claim 14, wherein the second audio/video content is an advertisement.

20. A set-top box system, comprising:
a memory of the set-top box configured to store user data;
a display configured to display a plurality of windows; and
a processor configured to:
- track a display size that a user selected for previous picture-in-picture content that was displayed to the user;
- output, from the set-top box to the display, a video component of a first audio/video content to be displayed in a first window;
- obtain identifying information about the user watching the first audio/video content;
- generate augmented information based on the user data from the memory of the set-top box and the identifying information;
- select, based on the augmented information, a second audio/video content;
- determine, based on the augmented information, that the second audio/video content is similar to the previous picture-in-picture content;
- in response to determining that the second audio/video content is similar to the previous picture-in-picture content:
    - select a display size of a second window to be displayed concurrently with the first window based on the tracked display size for the previous picture-in-picture content;
- compare video frames of the first audio/video content;
- determine whether the video frames are within a similarity threshold;
- in response to determining that the video frames are within the similarity threshold during a period of the first audio/video content:
    - output, from the set-top box to the display, a video component of the second audio/video content to be displayed in the second window having the display size of the second window that is to be concurrently displayed with the first window;
- while the second audio/video content is being output to be displayed in the second window, determine whether the video frames satisfy a difference threshold; and
- in response to determining that the video frames satisfy the difference threshold, discontinue output of the second video content to discontinue display of the second window.

* * * * *